(12) United States Patent
Bartels et al.

(10) Patent No.: US 8,427,753 B2
(45) Date of Patent: Apr. 23, 2013

(54) USE OF A FLUID MIXTURE FOR ELECTROWETTING A DEVICE

(75) Inventors: Frank Bartels, Hattingen (DE); Dieter Jerosch, Bad Soden (DE)

(73) Assignee: Advanced Display Technology AG, Appenzell (CH)

( * ) Notice: Subject to any disclaimer, the term of this patent is extended or adjusted under 35 U.S.C. 154(b) by 535 days.

(21) Appl. No.: 12/450,816

(22) PCT Filed: Apr. 17, 2008

(86) PCT No.: PCT/EP2008/003061
§ 371 (c)(1),
(2), (4) Date: Jan. 14, 2010

(87) PCT Pub. No.: WO2008/128697
PCT Pub. Date: Oct. 30, 2008

(65) Prior Publication Data
US 2010/0108516 A1    May 6, 2010

(30) Foreign Application Priority Data

Apr. 21, 2007  (DE) .......................... 10 2007 018 959
Dec. 28, 2007  (DE) .......................... 10 2007 063 343

(51) Int. Cl.
*G02B 1/06* (2006.01)
*G02B 3/12* (2006.01)

(52) U.S. Cl.
USPC ............................ 359/665; 359/666; 359/667

(58) Field of Classification Search ........... 359/665–667
See application file for complete search history.

(56) References Cited

U.S. PATENT DOCUMENTS 5,812,158 A    9/1998  Murthy et al.
7,016,560 B2   3/2006  Ticknor et al.
(Continued)

FOREIGN PATENT DOCUMENTS

DE    10 2006 038 618 A1    2/2007
EP         0 785 073 B1    11/2001
(Continued)

OTHER PUBLICATIONS

D.Y. Kim et al; Liquid-state field-effect transistors using electrowetting; Applied Physics Letters, vol. 90, No. 4; Jan. 22, 2007; American Institute of Physics.
Johan Feenstra et al.; Electrowetting Displays; Liquavista BV; 16 pages; Jan. 2006.
Y. Fouillet et al; EWOD Digital Microfluids for Lab on a Chip;Keynote Paper; 10 pages; Proceedings of ICNMM2006 Fourth International Conference on Nanochannels, Microchannels and Minichannels; Jun. 19-21, 2006; Limerick, Ireland.

*Primary Examiner* — Evelyn A. Lester
(74) *Attorney, Agent, or Firm* — Marshall & Melhorn, LLC

(57) ABSTRACT

The invention relates to the use of a fluid mixture for electrowetting in a device that is suitable for this.
According to the invention, the fluid mixture consists of at least two components, namely an electrically inducible liquid and an electrically inert fluid. These two components form a bi- or multiphasic mixture. The electrically inducible liquid responds to a change of an electric field that surrounds it or completely or partly permeates it, in such way that it changes its surface tension so that its form is changed too, particularly if only parts of its surface are permeated by the electric field, or if the field strength is distributed not homogenously.
According to a particularly preferred embodiment, the electrically inducible liquid consists of propylene carbonate. As a result of using this liquid, the temperature range, in which a device being based on the electrowetting effect may be operated, is expanded in such way, that application areas are made possible which so far have not been usable using conventional, particularly aqueous, liquids.

12 Claims, 1 Drawing Sheet

U.S. PATENT DOCUMENTS

| | | |
|---|---|---|
| 7,172,947 B2 | 2/2007 | Li et al. |
| 7,265,911 B2 | 9/2007 | Goosey, Jr. et al. |
| 7,298,559 B2 | 11/2007 | Kato et al. |
| 7,304,786 B2 | 12/2007 | Hagood et al. |
| 7,404,982 B2 | 7/2008 | Toyoda |
| 7,545,430 B2 | 6/2009 | Nakagawa |
| 7,551,344 B2 | 6/2009 | Hagood et al. |
| 2005/0111842 A1* | 5/2005 | Nakagawa ..................... 396/85 |
| 2007/0040146 A1 | 2/2007 | Bae et al. |
| 2007/0236803 A1 | 10/2007 | Ohishi et al. |
| 2008/0231964 A1 | 9/2008 | Tijburg et al. |
| 2008/0297880 A1 | 12/2008 | Steckl et al. |
| 2009/0141366 A1 | 6/2009 | Ohishi et al. |

FOREIGN PATENT DOCUMENTS

| | | |
|---|---|---|
| EP | 1 708 006 A1 | 10/2006 |
| EP | 1 840 624 A1 | 10/2007 |
| WO | WO 2006/017129 A2 | 2/2006 |
| WO | WO 2007/024482 A2 | 3/2007 |
| WO | WO 2007/034377 A2 | 3/2007 |

\* cited by examiner

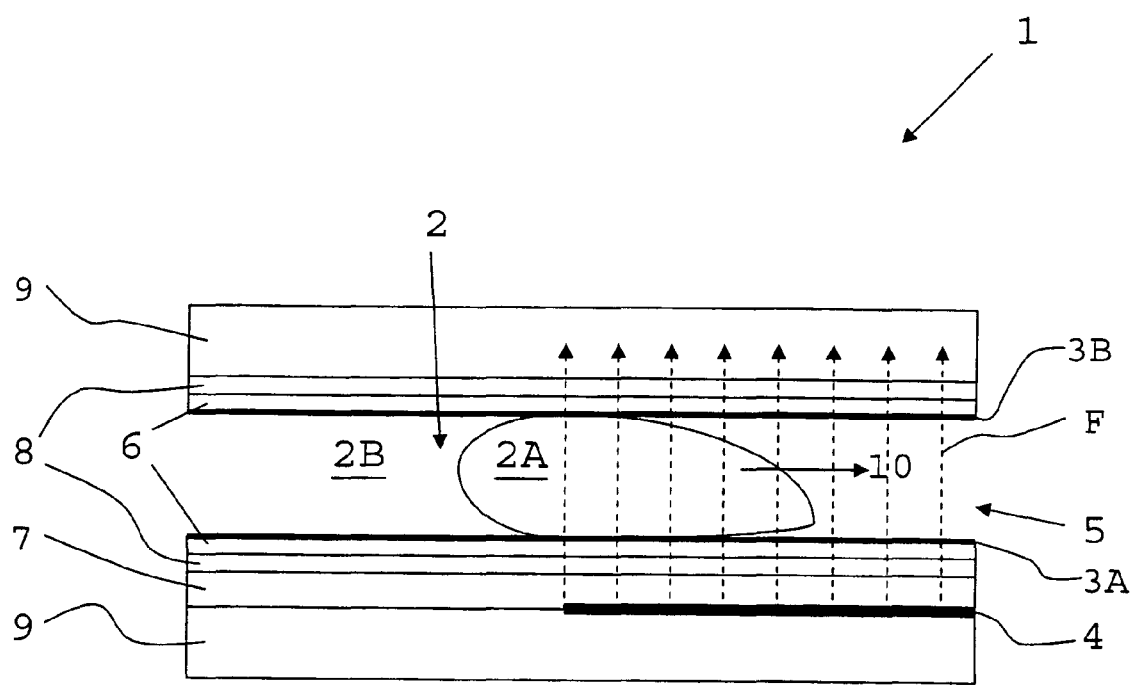

USE OF A FLUID MIXTURE FOR ELECTROWETTING A DEVICE

The invention relates to the use of a fluid mixture for electrowetting in a suitable device and to a device for manipulating the fluid mixture according to the invention using the electrowetting effect.

The term "electrowetting" describes the effects of an electric field on the surface tension of a liquid. By decreasing the surface tension, the liquid distributes over a surface that initially repels the drop and preferably simultaneously represents an electrode. By increasing the surface tension, the liquid contracts and forms a rather spherical drop. Therefore, the liquid may be termed "electrically inducible".

In the case of a single drop, the surface tension modification results in a change of the contact angle with which the drop wets the bottom surface. The relationship between the field strength and the contact angle change is described by the Lippmann-Young equation, and is known to a person skilled in the art.

Thus, by a local variation of the electric field strength from zero to a maximum value, the local surface tension of the liquid may be modified and in this way the geometrics of the drop may be locally changed. Specifically, by generating a locally decreased surface tension, a movement of the drop may occur as the drop expands preferably into the respective area characterized by the presence of an electric field. Vice versa, liquid is pressed out of the area of high surface tension, as in this area the drop aspires to assume the geometric form with the lowest energy, i.e. a spherical form. This results in a net transport of liquid out of the area with low into the area with high field strength.

Often the electrically inducible liquid is embedded in an, according to the above terminology, "electrically inert" fluid, e.g. in oil, whereby it is to be ensured that the two fluids won't mix. It is particularly preferred that the electrically inert fluid is of such kind that its surface tension may essentially not be influenced by an electric field. However, as well, configurations may be conceivable in which both liquids are electrically inducible, yet not to the same degree. By applying an electric field, the electronically inducible (or more inducible) liquid displaces the electrically inert (or more inert) liquid by attaching itself to the respective surface or electrode or moving into the area with higher field strength and therefore lower surface tension.

Another method for manipulating liquids or fluid mixtures, in which electrical fields are applied as well, is based on their effect on the dipoles present in polar liquids. In such liquids, such as e.g. in water, the effect of an electric field may thus not only be observed in an electrowetting situation but also under other circumstances. If a drop of a polar liquid is positioned on a superhydrophobic surface (contact angle almost 180 degrees, corresponding to a spherical drop form) the friction force between the superhydrophobic surface and the drop is reduced to a minimum, so that a rolling movement of the drop can take place almost without friction. Small drops particularly are attracted by an electric field on such surfaces (field attraction effect), because single molecules (dipoles) of the liquid align in the electric field. Thereby, single drops of such polar liquids may be moved. It is also possible to move drops that are present in a fluid mixture, provided that the two fluids are present in two separate phases, identically to the above described variant. Nonetheless, the increased friction can be observed in this case in the electrically inert fluid, particularly if the fluid is a liquid.

As both of the described effects essentially use identical devices and act on essentially identical liquids, the causative effects may not be distinguished clearly, due to the similarity of their impacts. Thus, an overlap of both effects can be expected as well.

The following statements will be illustrated using the electrowetting effect; of course, by this, the applicability to the described field attraction effect is not excluded, but expressly disclosed as well.

BACKGROUND OF THE ART AND DRAWBACKS

As an electrically inducible, i.e. polar or dipoles containing liquid, mostly demineralized (DI) water is used. DI water is readily available and has good dipole properties. Furthermore, it does not mix with oil as an electrically inert fluid, and for this reason, virtually all devices that have been known so far and which work with electrowetting use combinations of water and oil.

For example, a first application of a liquid-operated field effect transistor (D. Y. Kim and A. J. Steckl: "Liquid-state field-effect transistors using electrowetting"; Applied Physics Letters, Vol. 90, No. 4; Jan. 22, 2007) uses a combination of water, which has been supplemented with sodium chloride for conductivity reasons, and a non-polar, not further described, oil.

In a second application, a fluidic display, in which the pixels are operated using electrowetting, water and oil are used as well (Johan Feenstra & Rob Hayes: "Liquavista electrowetting displays", Liquavista BV, The Netherlands, January 2006; http://www.liquavista.com/files/LQV060828XYR-15.pdf; see e.g. also U.S. Pat. No. 7,304,786, "Methods and apparatus for bi-stable actuation of displays").

In a third application relating to a lens consisting of liquid, a water and oil combination also is used, with both liquids having similar densities, but different refractive indexes. When a voltage is applied to an electrode, the interface between both liquids alters its form resulting in the lens effect (www.varioptic.com). Furthermore, the patent associated with this technology (WO/1999/018456 LENS WITH VARIABLE FOCUS) mentions, only vaguely, a first, conductive and a second isolating liquid, but specifically discloses for the first liquid solely water or "all organic or non-organic liquids that are conductive or may be made conductive".

In a fourth application, relating to the so-called "lab on a chip" systems, again water is used embedded in oil. By applying several electric fields, liquid drops may be moved, separated from each other and connected with each other (Y. Fouillet et al.: "EWOD Digital Microfluidics For Lab on A Chip", Keynote Paper, Proceedings of ICNMM 2006, June 2006, Limerick, Ireland).

Whereas the advantages of the ready and secure as well as cheap availability of water as the electrically inducible liquid are obvious, the limited temperature range has turned out to be problematic. As water is known to freeze at 0° C. and to boil at 100° C., all applications based on electrowetting and using water as liquid are restricted to this temperature range. In addition to the mere failure of an electrowetting device based on water which is to be expected outside the allowed temperature range, it must be assumed that it will be destroyed when leaving the allowed temperature range, because water has the property of expanding in the solid state of freezing as well as in the gaseous state of boiling, accordingly requiring more volume. Whereas in the case of overheating, appropriate extra reservoirs may be used providing the necessary larger volume, supercooling is more problematic, as the frozen liquid does not move anymore, so that a permanent damage of the fluidic parts of the system can hardly be excluded.

Thus, conventionally constructed devices may not be used at low temperatures, such as e.g. outside in winter, or at high temperatures, such as e.g. as display devices in the area of combustion machines, or e.g. in bright sun light on or at the dashboard of an automobile.

OBJECTIVE OF THE INVENTION AND SOLUTION

It is therefore the objective of the invention to provide a polar liquid that may be used instead of water in devices that are based on the use of the electrowetting effect, and which has all the features of a liquid that is suitable for this purpose, with the liquid specifically being characterized by having a wider application temperature range compared to water. Other features are:

- no miscibility with a second liquid which preferably is based on oil (dual-phase mixture);
- a density which is preferably in the range of the density of water, such as e.g. ±20%;
- a lower dynamic viscosity, preferably in the range of 1 mPa·s;
- a low surface tension;
- no absorption of visible light (colorlessness).

The objective is solved using the substance described in claim 1 and the device proposed in claim 13. Preferred embodiments are found in the dependent claims and the description as well as in the FIGURE.

SUMMARY OF THE FIGURE

The single FIGURE shows the cross-section of a preferred embodiment of the device according to the invention using the liquid according to the invention.

DESCRIPTION

The invention relates to the use of a fluid mixture for electrowetting in a device that is suitable for this.

A device suitable for manipulating fluids using electrowetting comprises at least the following components or features:
- a first surface,
- a switchable electric field,
- an electrically inducible liquid,
- an electrically inert fluid.

The first surface serves as base or interface for the fluid and, if necessary, for receiving further components such as e.g. hydrophobic coatings, electrodes and the like.

The switchable electric field serves to influence the fluid mixture according to the invention, and will be formed, for instance, between one or more electrodes that may preferably be present in the first surface, and the surroundings (monopolar arrangement), or the electrical field alternatively forms between such electrodes and one or more further electrodes forming the corresponding antipole (bipolar arrangement).

Furthermore, an electrically inducible liquid is provided which is of the kind described in more detail below or has corresponding features.

According to this, the fluid mixture is characterized by consisting of at least one electrically inducible liquid and a second electrically inert fluid. The liquid is electrically inducible as the liquid responds to a change of the strength of the electrical field that surrounds it or permeates it completely or partially, in such way that its surface tension changes.

Furthermore, the fluid mixture is characterized by being placeable on or near the first surface. According to a first embodiment, this means that it lies directly against the first surface or touches it. Naturally, it is not possible and not necessary for the fluid mixture to completely lie against the first surface; instead, it is sufficient if at least a part of the fluid mixture touches the first surface. According to a second embodiment, the fluid mixture is only close to the first surface, meaning it is so close that an electric field that is generated for example by the electrodes present in the first surface, still has sufficient strength to induce the influence on the fluid mixture according to the invention.

Whereas, as already mentioned, the surface tension of the electrically inducible liquid according to the invention may be influenced by the strength of the electric field, this is specifically not true for the electrically inert field according to the invention. In other words, the electrically inert field does not change its surface tension when the surrounding or completely or partially permeating electric field changes. According to an alternative embodiment, the field can be influenced at least only marginally by the strength of the electric field. In any case, a clear difference between the response of the two liquids or fluids to field strength changes must be present for the electrowetting effect being able to develop in a technically applicable form. Preferably, the impact factor regarding the inducibility should be at least 2, meaning that the response of the electrically inducible liquid to field strength changes resulting in a change of its surface tension is at least twice the response of the electrically inert fluid. However, an impact factor of 10 or more is particularly preferred.

The fluid mixture according to the invention may have exactly one electrically inducible and one electrically inert component, or, according to other embodiments, may also comprise several of the respective components. For example, a combination of one electrically inert component combined with two electrically inducible components is conceivable to maintain a fluid mixture according to the teachings of the present invention.

Furthermore, the fluid mixture is characterized by the electrically inducible component(s) forming a mixture of one or several phases with the electrically inert component(s). This means, that, according to an embodiment comprising a specific number of electrically inducible and inert components, exactly two phases are formed, where all electrically inducible components are present in a first phase, and all electrically inert components are present in a second phase. "Biphasic" means that the two component types do not mix with themselves by their own. According to another embodiment comprising more than two fluid components in total, more than two phases may also be formed, but again it would be required that all electrically inducible and electrically inert components are present in different phases. According to another embodiment also comprising more than two fluid components in total, the electrically inducible and electrically inert components may be present in at least two phases, wherein at least one of the phases may be composed of electrically inducible and electrically inert components. The only essential requirement is that the components in total represent a phase which compared to the other phase(s) shows a different sensitivity to the electrical field.

Finally it is provided according to the invention that at least the electrically inducible liquid has a freezing point below and/or a boiling point above water. Preferably, the freezing point is at least −15 degrees Celsius or lower, and the boiling point is 130 degrees Celsius or higher. Particularly preferably, the freezing point is at least −25 degrees Celsius or lower, and the boiling point is 230 degrees Celsius or higher.

According to a preferred embodiment, the fluid mixture is characterized by the electrically inert fluid also having a freezing point below and/or a boiling point above water. The preferred and particularly preferred temperature ranges are the same as for the electrically inducible liquid. Accordingly, the fluid mixture then altogether has the property of a respective temperature range.

Such a wider temperature range compared to water makes it possible that the fluid mixture according to the invention may be used for example in cold storage houses, outside in minus degrees or in the immediate proximity of combustion machines or other high temperature devices, i.e. in environments in which conventional fluid mixtures may be damaged and may not be able to serve their initial purpose anymore.

According to a further preferred embodiment, at least one of the components of the fluid mixture according to the invention has a density corresponding to the density of water. Especially preferred, this is the electrically inducible component, and most preferred both components.

According to an alternative embodiment, at least one of the components of the fluid mixture according to the invention has density in the range of 0.75 to 1.25 g/cm$^2$. It has been found that fluids with a density within this range exhibit particularly good manipulation properties.

According to a further preferred embodiment, at least one of the components of the fluid mixture according to the invention has a dynamic viscosity corresponding to that of water at 21° C.

According to an alternative embodiment, at least one of the components of the fluid mixture according to the invention has a dynamic viscosity in the range of 0.5 to 25 mPa·s.

According to a further embodiment, at least one of the components of the fluid mixture according to the invention has without being influenced by an electric field a surface tension in the range of 100 mN/m at most. Again, experiments have shown that a surface tension smaller than or equal to that of water (72.75 mN/m at 20 degrees Celsius) has an advantageous effect on the usability of the electrowetting effect. Particularly preferred, the surface tension is lower than 25 mN/m.

According to another preferred embodiment of the fluid mixture, it is characterized by the electrically inducible liquid and/or the electrically inert fluid being stainable, preferably each by addition of different dyes. By this, in the simplest case, light/dark changes, but also other color changes or overlay effects may be achieved, for example when several levels with differently stained fluid mixtures being on top of each other are overlaid. According to another embodiment with more than two components being present, the staining is not coupled to these components but to the phases. As argued above, these phases may contain both component types (electrically inducible/electrically inert), as long as the phases remain distinguishable with regard to their sensitivity to the electric field. Thus it is reasonable in these cases to couple the dyes to the phases and not to the respective fluid components.

According to another embodiment, at least one of the phases of the fluid mixture has a transmittance of at least 50% for light in the wavelength range of 380 to 750 nm. This wavelength range corresponds to the range of visible light. Due to the high transmittance, the fluid mixture may well serve as the basis for display instruments using the electrowetting effect, and in which for example an illumination of the display from the back is provided. The same is true for illumination from the front, when behind the display elements which are manipulated by electrowetting a reflective layer is positioned which reflects light entering from the front to the front, so that it must pass the fluid mixture twice. The functionality of the display can only be maintained because of the sufficiently high transmittance, i.e. if the transmittance was too low, either too much light power would be required, or the contrast of the display or the brightness of the display would be too low to be adequately readable. The presence of the feature of the transmittance is preferred particularly in connection with the above mentioned feature of the stainability.

According to a particularly preferred embodiment, the electrically inducible liquid of the fluid mixture according to the invention is derived from the group comprising the substances propylene carbonate, diethylcarbonate, diacetone alcohol, cyclohexanone, butylacetate, propylacetate and ethylhexanol. Experiments with these liquids have shown that these substances have some or all of the above mentioned features, and especially a boiling point above and a freezing point below water. Therefore, they are particularly well suited for the use as electrically inducible liquids within the scope of the invention.

Most preferred for this is propylene carbonate. This liquid reacts to the change of the electric field by changing its surface tension, it is transparent, does not mix with silicone oil, a commonly used electrically inert fluid, its density is within the above determined preferred limits, it can be stained, it freezes at −49 degrees Celsius and boils at 241 degrees Celsius. Propylene carbonate thus is ideal for the use as an electrically inducible liquid.

According to another preferred embodiment, the fluid mixture according to the invention is characterized by the electrically inert fluid being derived from the group comprising the substance groups of the gases, oils or oil-containing liquids and fluorine-containing liquids.

Air and inert gases are preferably used as gases.

If the electrically inert component is a liquid, silicone oil, perfluoro-octane, perfluorodecalin, the liquids FC-3283, FC-40 and FC-43 by 3M and perfluorononane are preferably used.

According to another preferred embodiment of the fluid mixture, it is characterized by the proportion of the electrically inducible liquid being between 30% and 70%. The remaining proportion consists of electrically inert fluid. However, depending on the application, other ratios may be reasonable and desirable. Especially, if the electrically inert fluid is a gas and adjoins to the environment, a reasonable ratio between the two components of the fluid mixture may not be specified anymore. Thus, the statement regarding the quantities' ratio is only valid for liquid systems that are preferably closed and thus have clearly detectable system boundaries. This is true, for example, for display instruments based on the electrowetting effect, but not, however, for assemblies in which a single liquid drop is manipulated on a surface that is upwardly open, i.e. that is, for example, surrounded by air.

The following describes a device with which the fluid mixture according to the invention is preferably used.

Thus, a device for manipulating a fluid mixture according to the invention consisting of at least one electrically inducible liquid and of an electrically inert fluid using the electrowetting effect comprises the following features:
  a first surface,
  at least one electrode,
  a fluid mixture,
  another surface,
  a hydrophobic coating,
  at least one dielectric layer,
  an adhesion promoter,
  a substrate for each surface.

The first surface already has been described above and essentially serves to confine the device and the reception of the fluid mixture or to confine the range of motion of the fluid mixture. Furthermore, the first surface may also contain other components or may directly adjoin to them, as will be described in detail in the following.

The switchable electric field which is required according to the invention will preferably be generated using at least one electrode. Alternatively, also a plurality of electrodes may be present, which are connected in combination, sequentially or according to another pattern. The area of the at least one electrode may cover the entire or only a part of the first and/or the further surface. The form of at least one electrode may be rectangular, round, elliptical or differently formed. The at least one electrode may be transparent, opaque or non-transparent.

Furthermore, a fluid mixture according to the invention is also part of the device, comprising the above described electrically inducible liquid according to the invention, as well as the electrically inert fluid. All other embodiments that have been correspondingly disclosed above, will also relate to this.

Another surface is also a component of the device according to the invention. This surface is disposed in such way that a gap forms between the first and the further surface, in which the fluid mixture may be positioned. This gap may be laterally open, or alternatively may be completely or partly confined. The only essential requirement is that within the gap the electrical field will be able to distribute and to influence the fluid mixture or its electrically inducible component. Preferably, both surfaces have the same size, are aligned in parallel to each other, and are formed essentially planar, so that a one- or two-dimensional gap is formed. This gap extends in one or two directions that, if necessary, extend perpendicularly to each other and also at the same time parallel to both surfaces. Preferably the gap extends considerably longer in this one or these two directions than in a direction that is perpendicular to the two surfaces. Thus, the one-dimensional gap corresponds to a canal, and the two-dimensional gap is formed between two plate-like surfaces that are slightly spaced apart from each other.

Furthermore, the device according to the invention comprises a hydrophobic coating which is present on one or on both surfaces. The coating shows in the direction of the fluid mixture and is of such kind that it repels it according to the invention. If the fluid mixture is not aqueous, the hydrophobization will be replaced accordingly by an appropriately suited layer repelling the fluid mixture. It may be sufficient if only one component or one phase of the fluid mixture is repelled. It is, however, preferred that the mixture as a whole is repelled.

A further component of the device is at least one dielectric layer each disposed between the respective surface and the hydrophobic coating, if present. This layer has several functions. It serves to enhance the electric field and therefore the electrowetting effect. Furthermore, it serves as electric insulation between the individual electrodes, particularly between the electrodes with different polarities, in order to avoid a short circuit.

Also, an adhesion promoter is preferably provided having the purpose of facilitating the joint of the hydrophobic coating and the respective layer underneath.

Finally, the device comprises a substrate for each surface which carries all described layers and ensures the material cohesion of the layers. This substrate may be made of glass, plastic, ceramics, metal or combinations thereof.

Furthermore, the device may also comprise one or more electric leads serving to connect the at least one electrode with the respective power supply being preferably disposed outside of the device.

According to an especially preferred embodiment of the device according to the invention, the electrically inducible liquid is propylene carbonate, the electrically inert fluid is oil or oil-containing, the hydrophobic layer is made of polytetrafluoroethylene, the adhesion promoter is a silane and the substrate is made of glass.

DESCRIPTION OF THE FIGURE

The FIGURE shows a cross-section of a preferred embodiment of the device 1 according to the invention, consisting of two substrates (9) serving as the basis for the other, not self-supporting layers. These layers are:

an electrode 4 to generate an electric field F, wherein this layer 4 is only present on one of the substrates 9 and covers it only partly in the shown embodiment;

a dielectric layer 7 for increasing the dielectricity, wherein this layer 7 is only present on the substrate 9 that also supports the electrode 4;

a layer 8 serving as adhesion promoter;

a hydrophobic coating 6, confining the corresponding layer composition.

The electric flux lines of the electric field F start at electrode 4; a counter electrode is not shown as it is represented by the environment. According to alternative embodiments (not shown) one or more electrodes may be provided in the opposite layer composition.

In-between the two layer compositions there is a gap 5 which is formed because the two hydrophobic coatings 6 do not touch directly, but are kept in a distance from each other. The surfaces delimiting the gap are formed according to the invention by the first surface 3A and the second surface 3B. This assignment is independent from the respective precise physical nature of the surfaces which varies according to the individual embodiment. For example, according to the shown embodiment, the first surface 3A is identical with the hydrophobic coating 6. If, necessary, lateral surfaces may be present (not shown) which delimit the fluidic system accordingly, and which may be present additionally according to other embodiments (not represented herein).

In-between the surfaces 3A and 3B, there is the fluid mixture 2 according to the invention, consisting of two components, one electrically inducible liquid 2A and an electrically inert fluid 2B. In the embodiment shown, liquid 2A is present between the surfaces 3A and 3B in the form of a drop. It is surrounded laterally by fluid 2B, not shown in more detail, which is immiscible with the electrically inducible liquid and thus forms a phase boundary.

Upon having been switched on, the electrical field F acts on the surface tension of the electrically inducible liquid 2A in such way that it decreases according to the invention. This results in the drop consisting of liquid 2A deforming in the direction of the area in which the electric field F is present. Accordingly it moves into motion direction 10.

REFERENCE NUMBER LIST

1 Device
2 Fluid mixture
2A Electrically inducible liquid
2B Electrically inert fluid
3A First surface
3B Second surface
4 Electrode
5 Gap
6 Hydrophobic coating
7 Dielectric layer 8 Adhesion promoter
9 Substrate
10 Motion direction
F Electric field

The invention claimed is:

1. A method of utilizing a fluid mixture for an electrowetting display device, comprising:
provideing a display device having:
a first surface,
a switchable electric field, and
the fluid mixture;
wherein the fluid mixture comprises an electrically inducible liquid and an electrically inert fluid, being on or close to the first surface, the electrically inducible liquid having a surface tension that is sensitive to the strength of the switchable electric field, the electrically inert fluid having a surface tension that is not or is only marginally sensitive to the switchable electric field, the electrically inducible liquid forming a bi- or multiphasic mixture with the electrically inert fluid of the fluid mixture, and at least the electrically inducible liquid having a freezing point below and/or a boiling point above water,
wherein the electrically inducible liquid is derived from the group comprising the substances propylene carbonate, diethylcarbonate, diacetone alcohol, cyclohexanone, butylacetate, propylacetate and ethylhexanol; and
wherein the electrically inducible liquid and/or the electrically inert fluid is stained; and
changing the strength of the switchable electric field so as to change the surface tension of the electrically inducible liquid.

2. The method according to claim 1, wherein the electrically inert fluid also has a freezing point below and/or a boiling point above water.

3. The method according to claim 1, wherein at least one of the electrically inducible liquid and the electrically inert fluid has a density corresponding to that of water.

4. The method according to claim 3, wherein at least one of the electrically inducible liquid and the electrically inert fluid has a density in the range of 0.75 to 1.25 g/cm$^2$.

5. The method according to claim 1, wherein at least one of the electrically inducible liquid and the electrically inert fluid has a dynamic viscosity corresponding to that of water at 21° C.

6. The method according to claim 5, wherein at least one of the electrically inducible liquid and the electrically inert fluid has a dynamic viscosity in the range of 0.5 to 25 mPA·s.

7. The method according to claim 1, wherein at least one of the electrically inducible liquid and the electrically inert fluid has a surface tension in the range of maximum 100 mN/m, without the influence of an electric field.

8. The method according to claim 1, wherein the electrically inducible liquid forms a mixture of one or several phases with the electrically inert fluid, and at least one of the phases has a transmittance of at least 50% for light in the wave length range of 380 to 750 nm.

9. The method according to claim 1, wherein the electrically inert fluid is derived from the group comprising the substance groups of the gases, oils or oil-containing liquids and fluorine-containing liquids.

10. The method according to claim 1, wherein the proportion of the electrically inducible liquid is between 30% and 70%.

11. A device for manipulating a fluid mixture using the electrowetting effect to provide a display, the device comprising the following features:
a first surface;
at least one electrode for generating a switchable electric field;
a fluid mixture;
another surface, being disposed in such way that in-between the first and the further surface a gap is formed in which the fluid mixture is positioned;
a hydrophobic coating on one or both of the surfaces;
at least one dielectric layer being disposed each between the respective surface and the hydrophobic coating;
an adhesion promoter serving to facilitate the joint of the hydrophobic coating and the respective layer underneath; and
a substrate for each surface;
wherein the fluid mixture comprises an electrically inducible liquid and an electrically inert fluid, being on or close to the first surface, the electrically inducible liquid having a surface tension that is sensitive to the strength of the switchable electric field, the electrically inert fluid having a surface tension that is not or is only marginally sensitive to the switchable electric field, the electrically inducible liquid forming a bi- or multiphasic mixture with the electrically inert fluid of the fluid mixture, and at least the electrically inducible liquid having a freezing point below and/or a boiling point above water,
wherein the electrically inducible liquid is derived from the group comprising the substances propylene carbonate, diethylcarbonate, diacetone alcohol, cyclohexanone, butylacetate, propylacetate and ethylhexanol; and
wherein the electrically inducible liquid and/or the electrically inert fluid is stained.

12. The device according to claim 11, in which the electrically inducible liquid is propylene carbonate, and the electrically inert fluid is oil or is oil-containing, and the hydrophobic layer is made of polytetrafluoroethylene, and the adhesion promoter is made of silane, and the substrate is made of glass.

* * * * *

UNITED STATES PATENT AND TRADEMARK OFFICE
CERTIFICATE OF CORRECTION

PATENT NO.       : 8,427,753 B2                                                                 Page 1 of 1
APPLICATION NO.  : 12/450816
DATED            : April 23, 2013
INVENTOR(S)      : Bartels et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this
Eighth Day of September, 2015

Michelle K. Lee
*Director of the United States Patent and Trademark Office*